US012643339B2

(12) United States Patent
Moore

(10) Patent No.: US 12,643,339 B2
(45) Date of Patent: Jun. 2, 2026

(54) PAINT TRAY CARRYING DEVICE

(71) Applicant: William Moore, Gaviota, CA (US)

(72) Inventor: William Moore, Gaviota, CA (US)

( * ) Notice: Subject to any disclaimer, the term of this patent is extended or adjusted under 35 U.S.C. 154(b) by 311 days.

(21) Appl. No.: 18/367,880

(22) Filed: Sep. 13, 2023

(65) Prior Publication Data

US 2025/0083472 A1 Mar. 13, 2025

(51) Int. Cl.
*B44D 3/14* (2006.01)
*B44D 3/12* (2006.01)

(52) U.S. Cl.
CPC ............... *B44D 3/14* (2013.01); *B44D 3/126* (2013.01)

(58) Field of Classification Search
CPC .......... B44D 3/121; B44D 3/128; B44D 3/12; B44D 3/126; E06C 7/14; A45C 13/28; A45C 13/26; B65D 25/28; B65D 25/282; B65D 25/2823; B65D 25/2826; B65D 25/2829; B65D 25/2832; B65D 25/2888; B65D 25/2891; B65D 25/2894; B65D 25/2882; B25G 3/34; B25G 3/36
USPC ........................ 220/570; 15/257.06; 206/509
See application file for complete search history.

(56) References Cited

U.S. PATENT DOCUMENTS 5,553,701 A 9/1996 Jarecki
D419,736 S * 1/2000 Clark .......................... D32/53.1
6,019,241 A 2/2000 Burns
6,622,340 B2 * 9/2003 Rosa ................... B05C 17/0245 220/570
7,611,009 B2 11/2009 Youngs
7,854,341 B2 * 12/2010 Martin ................... B44D 3/126 220/4.27
D729,477 S 5/2015 Abuzarifah
9,168,781 B1 * 10/2015 Cooper .................. B44D 3/126
9,545,815 B2 1/2017 Kiceniuk
9,713,374 B1 7/2017 Page
10,807,407 B1 10/2020 Huynh
11,420,795 B2 * 8/2022 Bergman ............... B65D 25/30
12,338,033 B2 * 6/2025 Given ................ B65D 25/2888
12,459,709 B1 * 11/2025 Edmonds ............... B65D 25/38
2007/0204423 A1 * 9/2007 Keane ...................... B44D 3/12 220/570
2012/0061399 A1 * 3/2012 Pohl ....................... B44D 3/126 220/570
2016/0152067 A1 * 6/2016 Rittmann ............... B44D 3/128 220/675
2022/0055400 A1 2/2022 Eldridge

FOREIGN PATENT DOCUMENTS

WO WO2018136928 7/2018

* cited by examiner

*Primary Examiner* — Corey N Skurdal

(57) ABSTRACT

A paint tray carrying device includes a box which has a front end that is open and an entrance extending through a top wall of the box which intersects the front end. In this way a paint tray can be inserted into the box having the paint tray in a horizontal orientation thereby inhibiting paint from spilling from the paint tray. Thus, the box and the paint tray inhibit the paint from being spilled on a crucially sensitive surface which is located near a painting work location. A gripping element is integrated into the top wall which can be gripped by a user for carrying the box and the paint tray. The gripping element is aligned with a center of gravity of the box to facilitate the box and the paint tray to be balanced on a horizontal plane when the user is carrying the box.

6 Claims, 7 Drawing Sheets

PAINT TRAY CARRYING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to paint carrying devices and more particularly pertains to a new paint carrying device for carrying paint tray without spilling paint from the paint tray. The device includes a box which has an open front end and an entrance extending through a top wall of the box to facilitate a paint tray to be inserted into the box while the paint tray is maintained in horizontal orientation. A gripping element is attached to the top wall and the gripping element is aligned with a center of gravity of the box to facilitate the box and the paint tray to be retained in a horizontal orientation while the box and the paint tray are being carried.

(2) Description of Related Art Including Information Disclosed Under 37 CFR 1.97 and 1.98

The prior art relates to paint carrying devices including a plurality of vessels that are structured to accommodate a paint tray and which each includes a lid that is releasably attachable to the vessel for closing the vessel and a plurality of painting supply buckets that are structured to carry painting supplies and which each has a suspension element for suspending the painting supply bucket from a support. In no instance does the prior art disclose a box that has an open front end and an entrance extending through a top of the box to facilitate a paint tray to be inserted into the box in a horizontal orientation and a gripping element that is aligned with a center of gravity of the box for balancing the paint tray on a horizontal plane.

BRIEF SUMMARY OF THE INVENTION

An embodiment of the disclosure meets the needs presented above by generally comprising a box which has a front end that is open and an entrance extending through a top wall of the box which intersects the front end. In this way a paint tray can be inserted into the box having the paint tray in a horizontal orientation thereby inhibiting paint from spilling from the paint tray. Thus, the box and the paint tray inhibit the paint from being spilled on a crucially sensitive surface which is located near a painting work location. A gripping element is integrated into the top wall which can be gripped by a user for carrying the box and the paint tray. The gripping element is aligned with a center of gravity of the box to facilitate the box and the paint tray to be balanced on a horizontal plane when the user is carrying the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
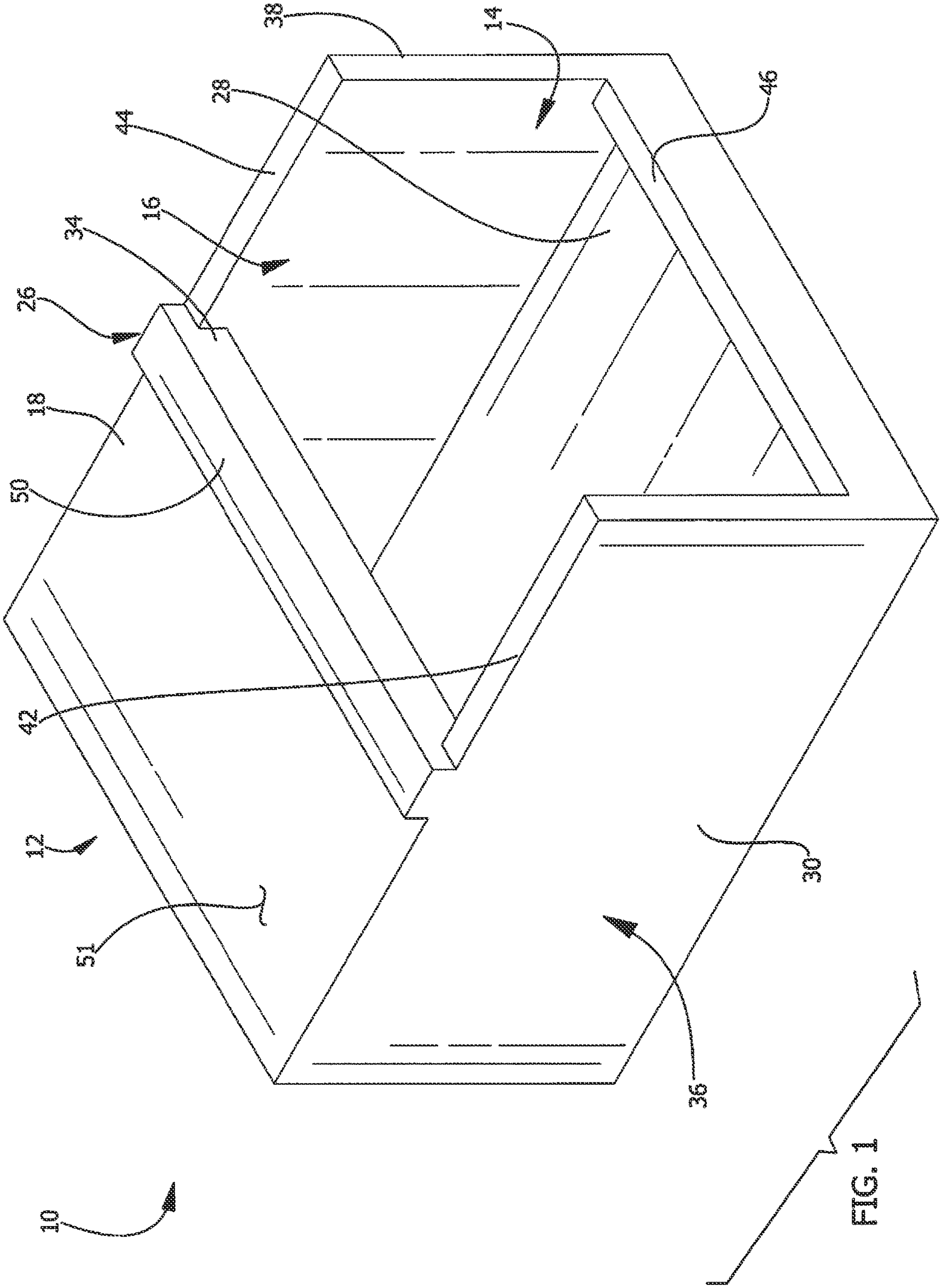
FIG. 1 is a top perspective view of a paint tray carrying device according to an embodiment of the disclosure.
Figure 2:
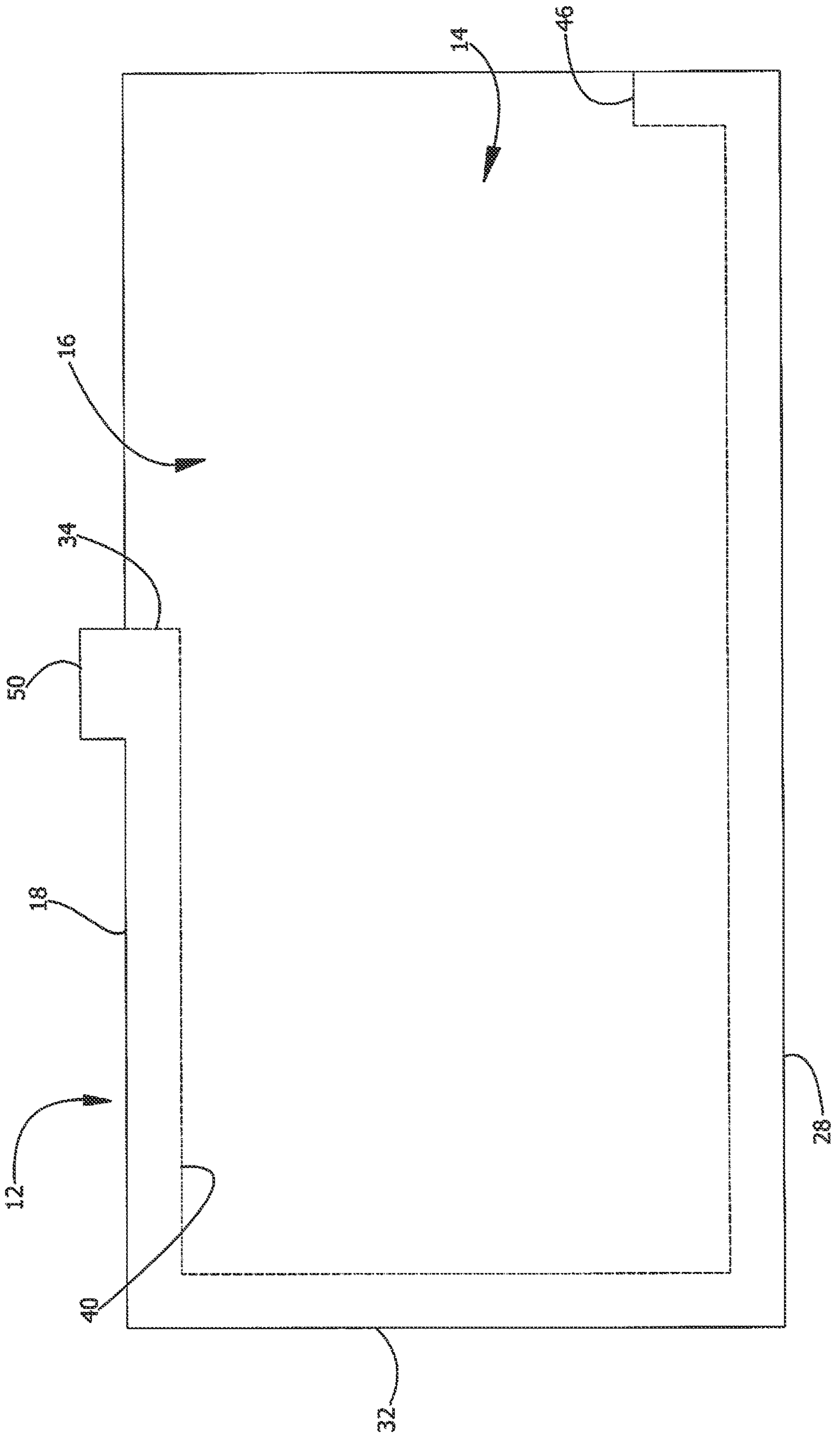
FIG. 2 is a right side phantom view of an embodiment of the disclosure.
Figure 3:
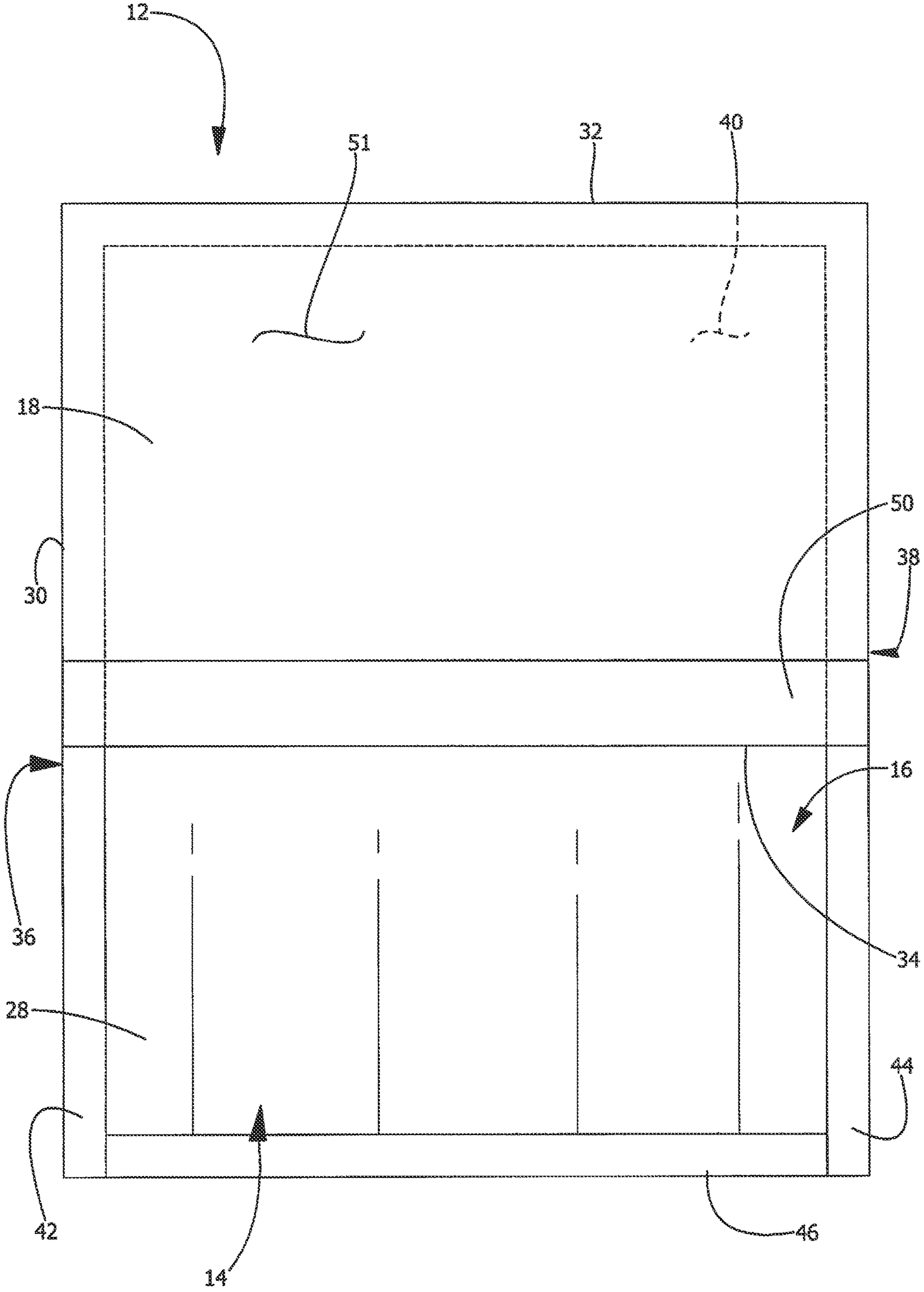
FIG. 3 is a top view of an embodiment of the disclosure.
Figure 4:
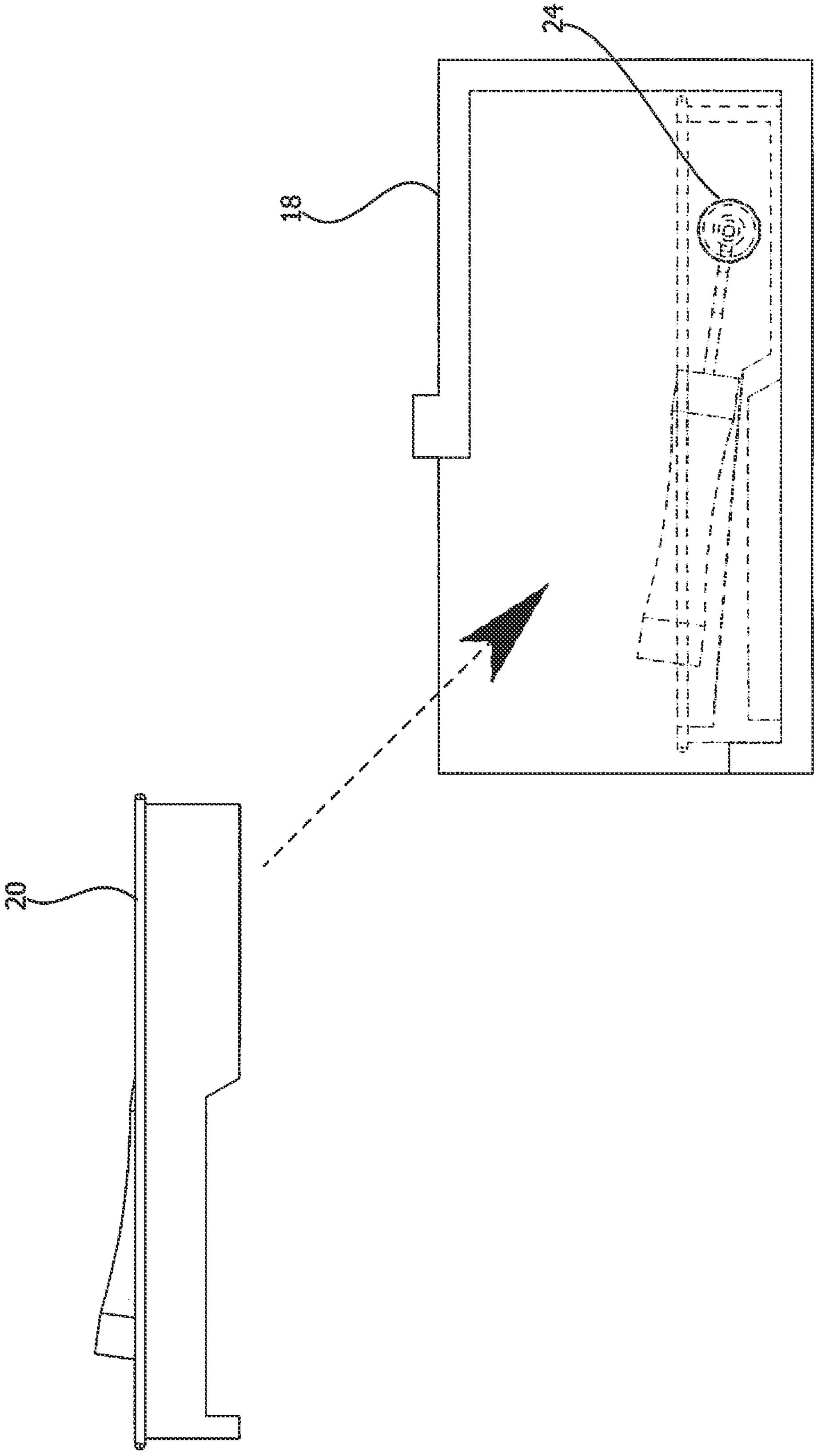
FIG. 4 is an exploded in-use view of an embodiment of the disclosure showing a paint tray being inserted into a box.
Figure 5:
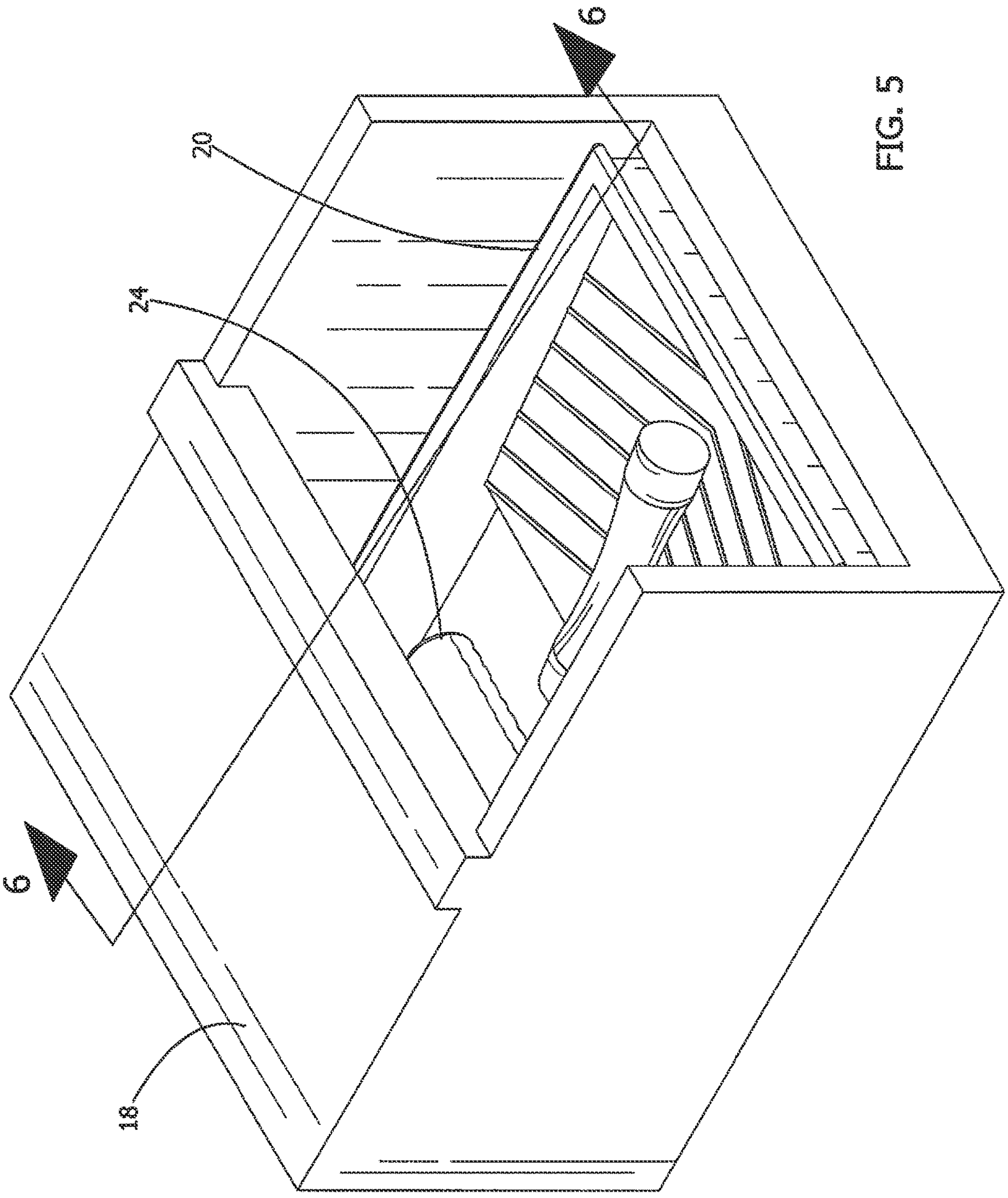
FIG. 5 is a perspective in-use view of an embodiment of the disclosure.
Figure 6:
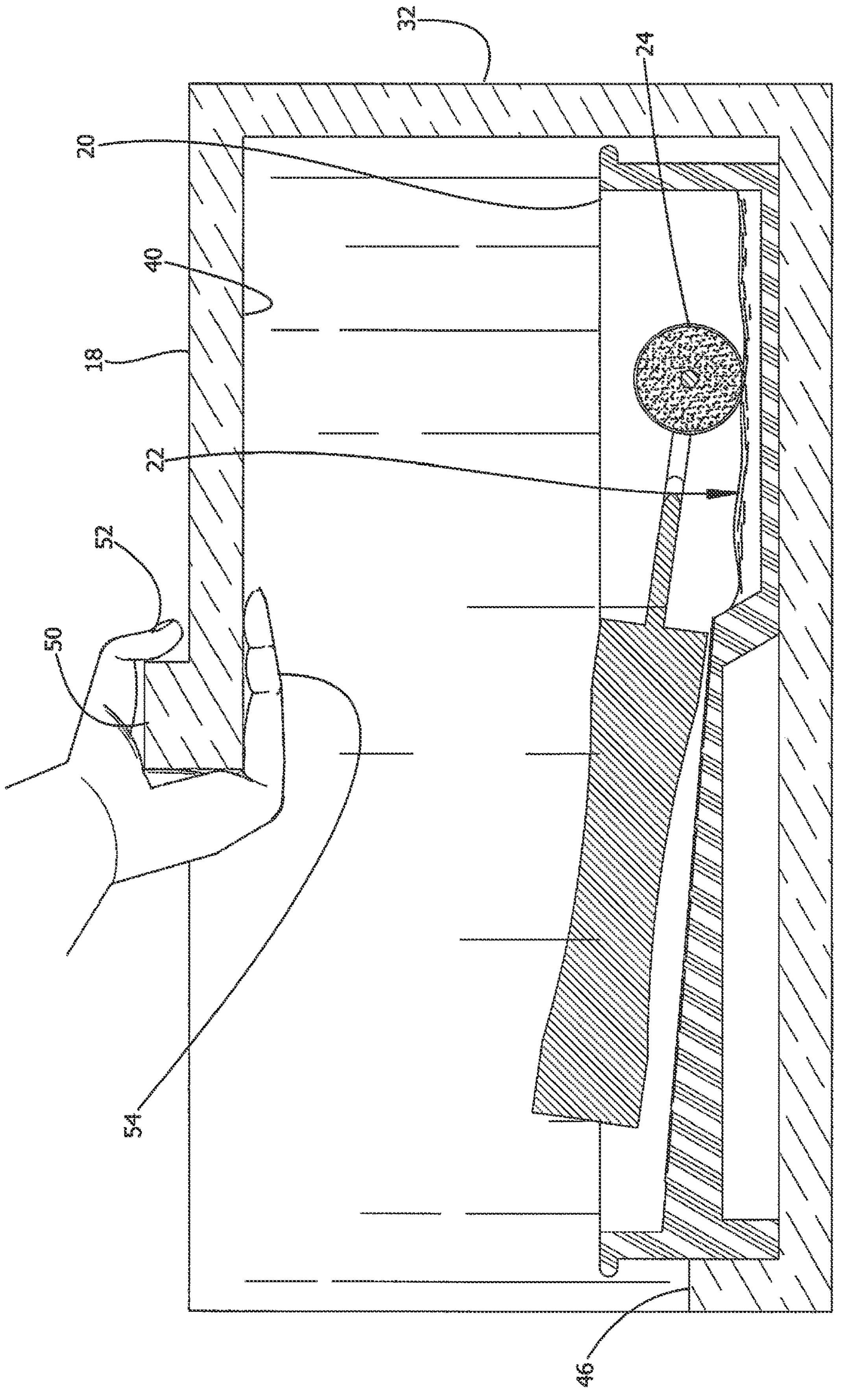
FIG. 6 is a cross sectional view taken along line 6-6 of FIG. 5 of an embodiment of the disclosure.
Figure 7:
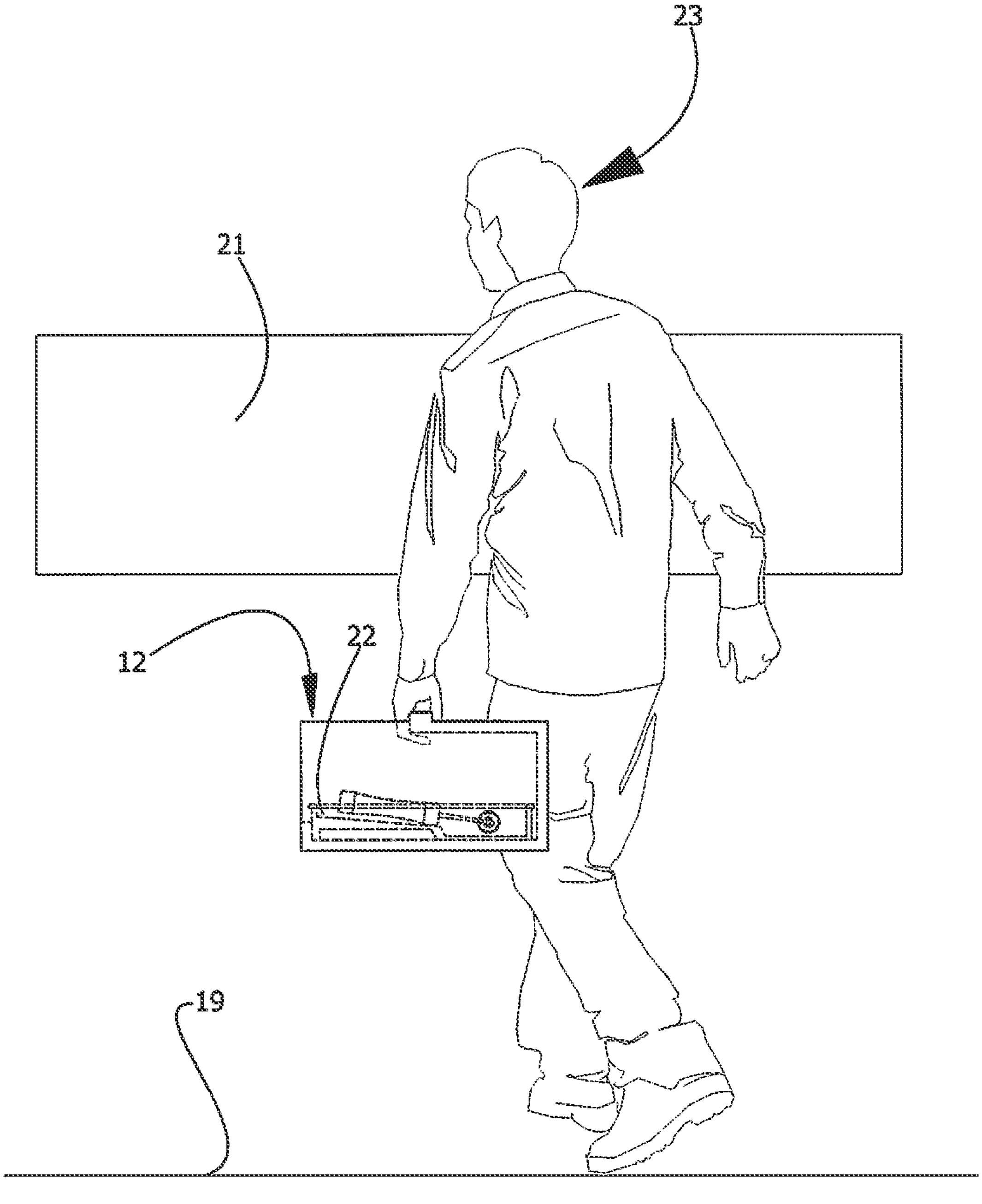
FIG. 7 is a phantom in-use view of an embodiment of the disclosure showing a user carrying a box and a paint tray.

With reference now to the drawings, and in particular to FIGS. 1 through 7 thereof, a new paint carrying device embodying the principles and concepts of an embodiment of the disclosure and generally designated by the reference numeral 10 will be described.

As best illustrated in FIGS. 1 through 7, the paint tray carrying device 10 generally comprises a box 12 that has a front end 14 which is open and an entrance 16 extending through a top wall 18 of the box 12 which intersects the front end 14. In this way a paint tray 20 can be inserted into the box 12 having the paint tray 20 in a horizontal orientation thereby inhibiting paint 22 from spilling from the paint tray 20. Thus, the box 12 and the paint tray 20 inhibit the paint 22 from being spilled on a crucially sensitive surface 19 which is located near a painting work location 21. The painting work location 21 may be a fixture on a marine vessel, for example, and the crucially sensitive surface 19 may be wood decking on the marine vessel or other type of surface that would be ornamentally damaged by spilled paint 22. The box 12 facilitates the user 23 to transport the paint tray 20 across the crucially sensitive surface 19 without the fear of spilling the paint 22 onto the crucially sensitive surface 19. The user 23 may be a paint worker or other individual that is tasked with applying paint to the painting work location 21. The paint tray 20 may be a paint tray of any conventional design and a paint roller 24 may be positioned in the paint tray 20.

The box 12 has a gripping element 26 that is integrated into the top wall 18 and the gripping element 26 can be gripped by the user 23 for carrying the box 12 and the paint tray 20. The gripping element 26 is aligned with a center of gravity of the box 12. In this way the gripping element 26 facilitates the box 12 and the paint tray 20 to be balanced on a horizontal plane when the user 23 is carrying the box 12. The box 12 has a bottom wall 28 and a perimeter wall 30 extending upwardly from the bottom wall 28 and the top wall 18 extends from a back side 32 of the perimeter wall 30 toward the front end 14 of the box 12. Furthermore, a terminal edge 34 of the top wall 18 and each of a first lateral side 36 and a second lateral side 38 of the perimeter wall 30 defines a boundary of the entrance 16. Additionally, the terminal edge 34 is centrally located between the back side 32 of the perimeter wall 30 and the front end 14 of the box 12.

A lower surface 40 of the top wall 18 is spaced below a top edge 42 of the first lateral side 36 of the perimeter wall 30 and a top edge 44 of the second lateral side 38 of the perimeter wall 30. Each of the first lateral side 36 and the second lateral side 38 extends between the back side 32 of the perimeter wall 30 and the front end 14 of the box 12. The box 12 has a lip 46 which extends upwardly from a top surface 48 of the bottom wall 28 and the lip 46 extends between the first lateral side 36 and the second lateral side 38 of the perimeter wall 30. The lip 46 is aligned with the front end 14 of the box 12 such that the lip 46 can contain any paint 22 that spills from the paint tray 20 into the box 12. In this way the spilled paint 22 is inhibited from dripping onto the crucially sensitive surface 19. As is most clearly shown in FIG. 6, the distance between the lip 46 and the back side 32 of the perimeter wall 30 closely matches the length of the paint tray 20 to inhibit the paint tray 20 from sliding back and forth in the box 12 while the box 12 is being carried.

The box 12 has a grip 50 extending upwardly from an upper surface 51 of the top wall 18 such that the grip 50 defines the gripping element 26. The grip 50 extends across a full width of the top wall 18 and the grip 50 is aligned with the terminal edge 34 of the top wall 18. In this way the grip 50 facilitates the user 23 to gain purchase on the top wall 18 with their thumb 52 when the user 23 extends their fingers 54 into the entrance 16 for carrying the box 12 with the top wall 18. The box 12 may have a width ranging between approximately 35.0 cm and 40.0 cm and a length ranging between approximately 43.0 cm and 48.0 cm and a height ranging between approximately 22.0 cm and 28.0 cm. The lip 46 may have a height ranging between approximately 2.5 cm and 5.0 cm and the grip 50 may have a height ranging between approximately 1.5 cm and 2.5 cm. Finally, the top wall 18 may have a length ranging between approximately 22.0 cm and 27.0 cm.

In use, the paint tray 20 is extended through the front end 14 of the box 12 to rest the paint tray 20 upon the bottom wall 28 of the box 12. In this way the paint tray 20 can be retained in a horizontal orientation while the paint tray 20 is being positioned in the box 12 to inhibit paint 22 from spilling from the paint tray 20. The user 23 grips the top wall 18 and the grip 50 to carry the box 12 and the paint tray 20. Furthermore, the orientation of the grip 50 on the box 12 ensures the box 12 and the paint tray 20 are balanced on a horizontal plane while the user 23 is carrying the box 12. Thus, the paint 22 is inhibited from spilling from the paint tray 20 while the box 12 is being carried. The lip 46 contains any spilled paint 22 in the box 12 thereby inhibiting the spilled paint 22 from dripping out of the box 12. In this way the paint tray 20 and the paint 22 can be safely carried over the crucially sensitive surface 19 without the fear of having paint 22 inadvertently dripping or spilling onto the crucially sensitive surface 19. Furthermore, the top wall 18 protects the paint 22 in the paint tray 20 from sunlight and from wind thereby inhibiting the paint 22 in the paint tray 20 from prematurely drying.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A paint tray carrying device for carrying a paint tray in a horizontal orientation to inhibit paint from spilling from said paint tray, said device comprising:

a box having a front end being open and an entrance extending through a top wall of said box which intersects said front end thereby facilitating a paint tray to be inserted into said box having said paint tray in a horizontal orientation thereby inhibiting paint from spilling from said paint tray wherein said box and said paint tray are each configured to inhibit the paint from being spilled on a crucially sensitive surface which is located near a painting work location, said box having a gripping element being integrated into said top wall wherein said gripping element is configured to be gripped by a user for carrying said box and said paint tray, said gripping element being aligned with a center of gravity of said box wherein said gripping element is configured to facilitate said box and said paint tray to be balanced on a horizontal plane when the user is carrying said box, said gripping element being defined by a grip extending upwardly from an upper surface of said top wall, said grip having a planar top surface having a width such that said grip is configured to extend from a distal palmar crease of a hand to an interphalangeal joint of a thumb of the hand to facilitate grasping of the box.

2. The device according to claim 1, wherein:

said box has a bottom wall and a perimeter wall extending upwardly from said bottom wall, said top wall extending from a back side of said perimeter wall toward said front end of said box such that a terminal edge of said top wall and each of a first lateral side and a second lateral side of said perimeter wall defines a boundary of said entrance;

said terminal edge is centrally located between said back side of said perimeter wall and said front end of said box;

a lower surface of said top wall is spaced below a top edge of said first lateral side of said perimeter wall and a top edge of said second lateral side of said perimeter wall; and each of said first lateral side and said second lateral side extends between said back side of said perimeter wall and said front end of said box.

3. The device according to claim 2, wherein:

said box has a lip extending upwardly from a top surface of said bottom wall;

said lip extends between said first lateral side and said second lateral side of said perimeter wall; and said lip is aligned with said front end of said box wherein said lip is configured to contain any paint that spills from said paint tray into said box thereby inhibiting the spilled paint from dripping onto the crucially sensitive surface.

4. The device according to claim 2, wherein:

said grip extends across a full width of said top wall; and said grip is aligned with said terminal edge of said top wall wherein said grip is configured to facilitate the user to gain purchase on said top wall with their thumb when the user extends their fingers into said entrance for carrying said box with said top wall.

5. A paint tray carrying device for carrying a paint tray in a horizontal orientation to inhibit paint from spilling from said paint tray, said device comprising:

a box having a front end being open and an entrance extending through a top wall of said box which intersects said front end thereby facilitating a paint tray to be inserted into said box having said paint tray in a horizontal orientation thereby inhibiting paint from spilling from said paint tray wherein said box and said paint tray are each configured to inhibit the paint from being spilled on a crucially sensitive surface which is located near a painting work location, said box having a gripping element being integrated into said top wall wherein said gripping element is configured to be gripped by a user for carrying said box and said paint tray, said gripping element being aligned with a center of gravity of said box wherein said gripping element is configured to facilitate said box and said paint tray to be balanced on a horizontal plane when the user is carrying said box, said box having a bottom wall and a perimeter wall extending upwardly from said bottom wall, said top wall extending from a back side of said perimeter wall toward said front end of said box such that a terminal edge of said top wall and each of a first lateral side and a second lateral side of said perimeter wall defines a boundary of said entrance, said terminal edge being centrally located between said back side of said perimeter wall and said front end of said box, a lower surface of said top wall being spaced below a top edge of said first lateral side of said perimeter wall and a top edge of said second lateral side of said perimeter wall, each of said first lateral side and said second lateral side extending between said back side of said perimeter wall and said front end of said box, said box having a lip extending upwardly from a top surface of said bottom wall, said lip extending between said first lateral side and said second lateral side of said perimeter wall, said lip being aligned with said front end of said box wherein said lip is configured to contain any paint that spills from said paint tray into said box thereby inhibiting the spilled paint from dripping onto the crucially sensitive surface, said box having a grip extending upwardly from an upper surface of said top wall such that said grip defines said gripping element, said grip extending across a full width of said top wall, said grip being aligned with said terminal edge of said top wall wherein said grip is configured to facilitate the user to gain purchase on said top wall with their thumb when the user extends their fingers into said entrance for carrying said box with said top wall, said grip having a planar top surface having a width such that said grip is configured to extend from a distal palmar crease of a hand to an interphalangeal joint of a thumb of the hand to facilitate grasping of the box.

6. A paint tray carrying system for carrying a paint tray in a horizontal orientation to inhibit paint from spilling from said paint tray, said system comprising:

a paint tray for containing a liquid paint; and a box having a front end being open and an entrance extending through a top wall of said box which intersects said front end thereby facilitating said paint tray to be inserted into said box having said paint tray in a horizontal orientation thereby inhibiting paint from spilling from said paint tray wherein said box and said paint tray are each configured to inhibit the paint from being spilled on a crucially sensitive surface which is located near a painting work location, said box having a gripping element being integrated into said top wall wherein said gripping element is configured to be gripped by a user for carrying said box and said paint tray, said gripping element being aligned with a center of gravity of said box wherein said gripping element is configured to facilitate said box and said paint tray to be balanced on a horizontal plane when the user is carrying said box, said box having a bottom wall and a perimeter wall extending upwardly from said bottom wall, said top wall extending from a back side of said perimeter wall toward said front end of said box such that a terminal edge of said top wall and each of a first lateral side and a second lateral side of said perimeter wall defines a boundary of said entrance, said terminal edge being centrally located between said back side of said perimeter wall and said front end of said box, a lower surface of said top wall being spaced below a top edge of said first lateral side of said perimeter wall and a top edge of said second lateral side of said perimeter wall, each of said first lateral side and said second lateral side extending between said back side of said perimeter wall and said front end of said box, said box having a lip extending upwardly from a top surface of said bottom wall, said lip extending between said first lateral side and said second lateral side of said perimeter wall, said lip being aligned with said front end of said box wherein said lip is configured to contain any paint that spills from said paint tray into said box thereby inhibiting the spilled paint from dripping onto the crucially sensitive surface, said box having a grip extending upwardly from an upper surface of said top wall such that said grip defines said gripping element, said grip having a planar top surface having a width such that said grip is configured to extend from a distal palmar crease of a hand to an interphalangeal joint of a thumb of the hand to facilitate grasping of the box, said grip extending across a full width of said top wall, said grip being aligned with said terminal edge of said top wall wherein said grip is configured to facilitate the user to gain purchase on said top wall with their thumb when the user extends their fingers into said entrance for carrying said box with said top wall.

* * * * *